(12) United States Patent
Peters

(10) Patent No.: US 6,848,824 B1
(45) Date of Patent: Feb. 1, 2005

(54) METHOD AND APPARATUS FOR TREATING GOODS

(75) Inventor: Antonius L. F. Peters, St. Michielsgestel (NL)

(73) Assignee: Proval Beheer B.V. (NL)

( * ) Notice: Subject to any disclaimer, the term of this patent is extended or adjusted under 35 U.S.C. 154(b) by 53 days.

(21) Appl. No.: 10/088,343

(22) PCT Filed: Sep. 18, 2000

(86) PCT No.: PCT/NL00/00660

§ 371 (c)(1),
(2), (4) Date: Aug. 7, 2002

(87) PCT Pub. No.: WO01/19196

PCT Pub. Date: Mar. 22, 2001

(30) Foreign Application Priority Data

Sep. 16, 1999 (NL) .............................. 1013067

(51) Int. Cl.$^7$ ............................. B01F 11/00; A23P 1/00
(52) U.S. Cl. ......................................... 366/239; 99/519
(58) Field of Search .............................. 366/239, 108, 366/209, 210–212, 218, 240; 426/519; 241/27, 177; 99/536, 348, 355

(56) References Cited

U.S. PATENT DOCUMENTS 4,520,718 A 6/1985 Prosenbauer

FOREIGN PATENT DOCUMENTS

| DE | 2807059 A | 8/1979 |
|----|-----------|--------|
| DE | 19539247 A | 4/1997 |
| EP | 0390286 A | 10/1990 |
| EP | 0434171 A | 6/1991 |
| EP | 0459974 A | 12/1991 |
| FR | 2285786 A | 4/1976 |
| WO | WO 99/63832 A | 12/1999 |

Primary Examiner—Tony G. Soohoo
(74) Attorney, Agent, or Firm—Banner & Witcoff Ltd.

(57) ABSTRACT

The invention relates to a method for treating food products wherein the food products are subjected to impacts, wherein the food products are placed in a container (1), are subsequently subjected to impacts through movements of the container and are finally taken out of the container. Device for treating food products, comprising: a container (1) which is movable on a horizontal rotation axis and which is opened on its upper side, and a drive device to cause the container to execute a reciprocating movement, wherein the container is placed at least one collision surface (4.5) which is arranged such that when the reciprocating movement of the container is executed the bodies placed in the container repeatedly strike the at least one collision surface. The food products are preferably formed by meat or fish pieces, and water is introduced into the container so that during the jolting in the container the food products at least partially absorb the water present in the container. These measures result in an improvement in the tenderness of the meat.

20 Claims, 5 Drawing Sheets

METHOD AND APPARATUS FOR TREATING GOODS

The invention relates to a method for treating products wherein the products are subjected to impacts, wherein the products are placed in a container, are subsequently subjected to impacts through movements of the container and then taken out of the container.

Such a method forms the subject-matter of the non-prepublished WO-A-99/63832.

This device is adapted for the treatment of meat pieces. The meat pieces placed in the container are carried along by the structures present in the container when the container is rotated. When a determined position has been reached the meat pieces drop off the structure and fall onto the then lowest container wall part. Structures are however also arranged on this container wall part. These structures at least partially negate the results of the fall during the collision with the container wall.

The object of the invention is to provide such a method wherein the result of the fall, i.e. the collision between the products and the container wall, is as great as possible.

The objective is achieved in that the products in the container collide with a substantially flat surface.

Because the products come into contact with the container wall with their whole surface, a larger part of the products undergoes the effect of the collision, so that the effectiveness is greatly increased.

A flat surface is also understood to mean for instance a slightly curved or ribbed surface.

It is noted here that it is of course known from the trade for a butcher to treat meat pieces for instance by hand, wherein the butcher strikes the meat piece with the blunt or flat side of a knife to make the meat piece more tender. It will be apparent that the capacity will be extremely low in the case of this traditional trade method. This limits the field of application to expensive food products, for instance meat of high quality such as rump steak.

Although the invention is aimed in the first instance at the application with food products, other applications are by no means precluded. Applications can be envisaged in for instance the laundry industry. The cleaning effect is here also greatly enhanced when the collision surface is as large as possible.

According to a first preferred embodiment the products are formed by meat or fish pieces and water is introduced into the container so that during the impacts in the container the products at least partially absorb the water present in the container.

These measures result in an improvement in the tenderness of the meat or the fish; the greater the collision surface, the better the absorption of water. Water is also understood to mean other water-containing liquids such as brine etc.

According to another preferred embodiment the products from a single transport container are placed in groups in the container, are treated and are placed from the container into a single transport container.

This method has the advantage that the content of a transport container fits precisely into a container in which the products are subjected to a treatment. The logistical advantage hereof is evident. Another advantage is that the content of a transport container does not come into contact with the content of other containers, so that cross-infection is prevented, particularly in the case of foodstuffs. A final advantage lies in the fact that a batch of products, i.e. the content of a transport container, is traceable. This is of great importance in respect of future legislation concerning foodstuffs. The treatment of small batches is also easier than in more of a bulk container.

This embodiment has the further advantage that a quantity of water or other water-containing liquid can be added to the batch. The device is found to be so effective that the available liquid is already fully absorbed by the products after only a short time. A prescribed quantity of liquid can hereby be administered more easily in reproducible manner.

The invention further relates to a method wherein the container on an end of a movement frame is placed into the movement frame, that the movement frame is suitable for containing more than one container, that the movement frame is drivable to execute a recurring movement and that simultaneously with placing of a container at one end a container is removed from the movement frame at the other side.

This embodiment also improves the logistical properties of the method; the containers can be simply shifted through.

The invention further relates to a device for treating products, comprising:
  a container which is movable on a substantially horizontal rotation axis and which is open on its upper side, and
  a drive device to cause the container to execute a recurring movement.

Such a device also forms the subject of WO-A-99/63832.

The same drawbacks obtain for the device described in this publication as for the method described in this publication.

In order to make such a device more effective in subjecting its content to impacts, such a device is characterized in that in the container is placed at least one flat collision surface which is arranged such that when the recurring movement of the container is executed the bodies placed in the container repeatedly strike the at least one collision surface.

According to an attractive preferred embodiment there are two collision surfaces arranged in the container which are placed symmetrically relative to the axis of rotation, and the drive device is adapted to cause the container to repeatedly execute a part of a revolving movement.

This results in a structurally attractive embodiment which, when included in a line for treating products, can be readily adapted to the requirements such as flow rate, dimensions of containers and the like of the remaining components of the line.

According to a particularly attractive embodiment, a holding surface is arranged connecting onto each of the collision surfaces, wherein the holding surfaces are placed symmetrically relative to the axis of rotation, the holding surfaces intersect at an angle lying between 90° and 150°, and the axis of rotation of the movement lies below the intersecting line of the holding surfaces.

This geometry has the result that firstly the products fall freely without contacting the walls by which the fall could be slowed, and that secondly the products not only drop straight downward but, if the drive velocity is sufficient, they cover an oblique, even slightly curved trajectory due to the impulse transmitted to the products during the movement. This greatly increases the collision speed.

The placing of the containers in the frame has the effect that the containers are subjected in groups to the recurring reciprocating movement. The fact that the containers are fed in at one side and discharged at the other side makes it possible to create a continuous system. Loading and unloading devices for the containers can be incorporated into this continuous system. The empty containers coming from the unloading device can be loaded again in the loading station, optionally after passing through a cleaning station.

Other attractive preferred embodiments are stated in the remaining sub-claims.

The present invention will be elucidated hereinbelow with reference to the annexed figures, in which.

Figure 1:
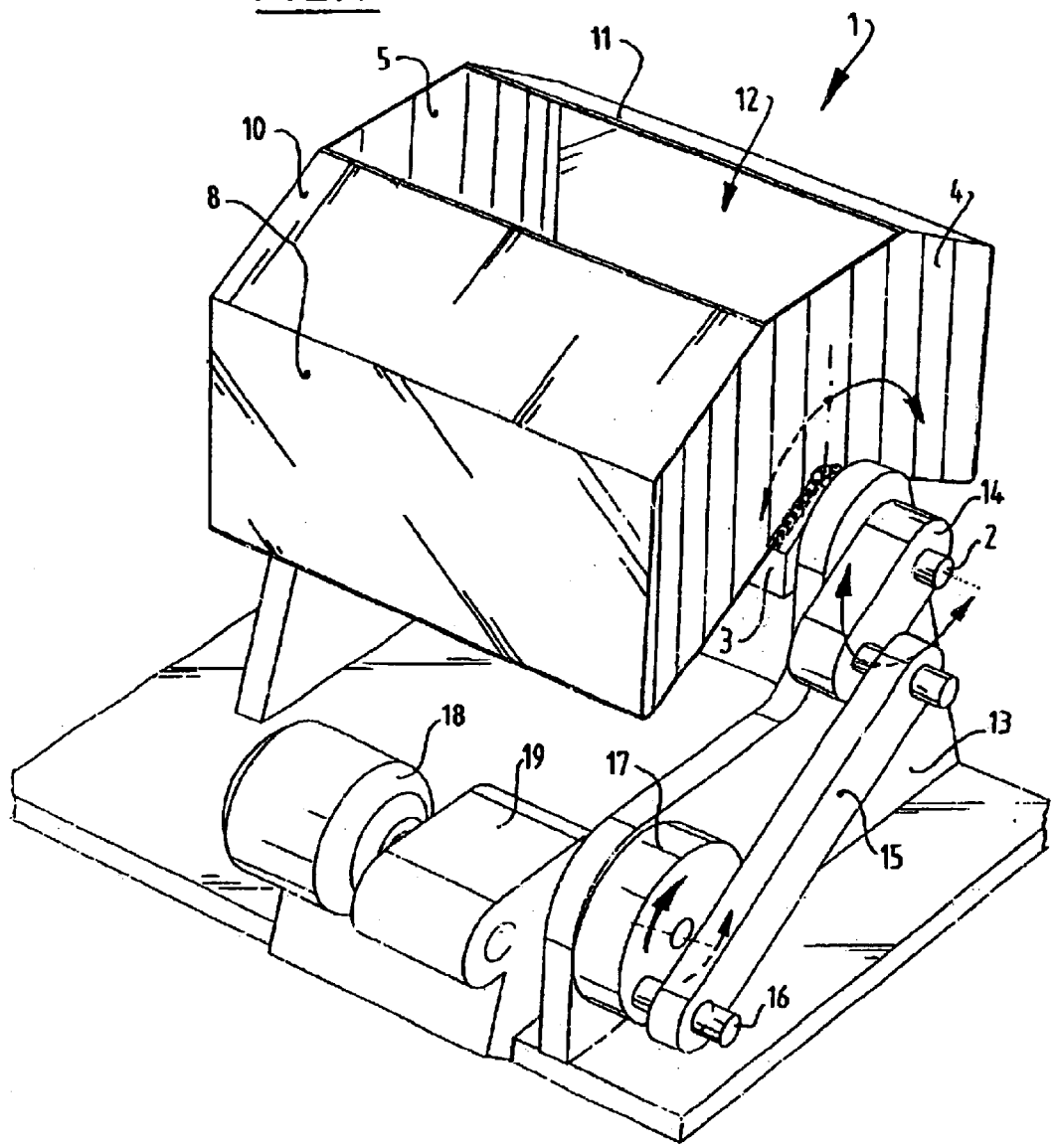
FIG. 1 shows a schematic perspective view of a first embodiment of the present invention.

The device for use in performing the method according to the present invention is shown in FIG. 1. This is formed essentially by a container 1 which is mounted tiltably on a shaft 2. Placed for this purpose on shaft 2 is a block 3 to which container 1 is attached.

Figure 2:
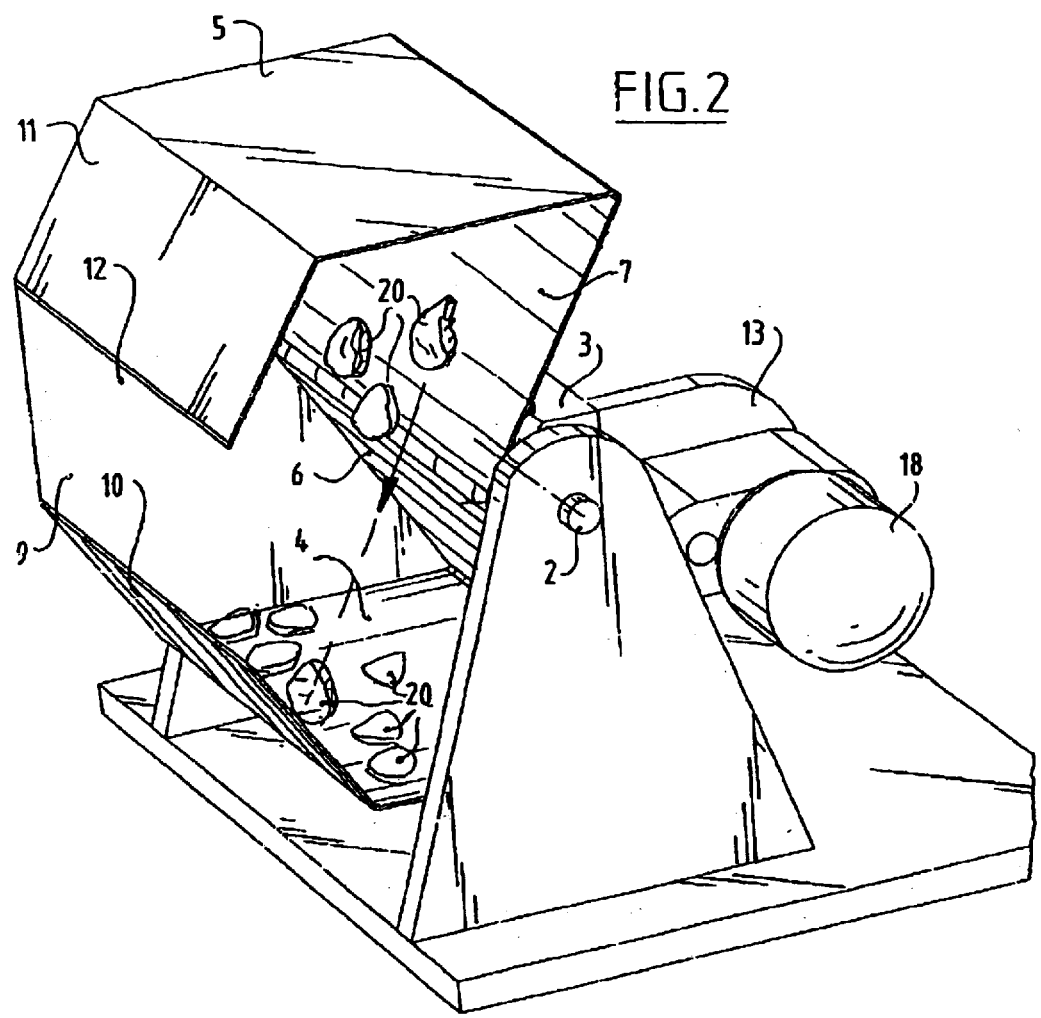
FIG. 2 is a partly broken-away perspective view of the container shown in FIG. 1.

Container 1 is formed essentially by two side plates 4 respectively 5, and two bottom plates 6,7 which are shown most clearly in FIG. 2. The two bottom plates enclose an angle of about 135°. Container 1 further comprises two end wall plates 8 respectively 9. Two cover plates 10 respectively 11 are further arranged on the upper side, between which plates is left an opening 12.

The whole container is manufactured from a suitable material, preferably stainless steel, for treating foodstuffs or products taken up in water.

In the embodiment shown in FIG. 1, the shaft 2 is mounted in two bearing blocks, only one of which, 13, is visible. Mounted on shaft 2 is a crank 14 which is connected by means of a drive rod 15 to a crank 16. Crank 16 is mounted on a disc 17 which is driven in rotation by an electric motor 18 and a reduction mechanism 19.

The dimensioning of cranks 14 respectively 16 and drive rod 15 is such that when disc 17 rotates the shaft 2 executes a recurring, reciprocating movement. The movement corresponds with a rotation through an angle of about 120°. It is anticipated that angles lying between 90° and 135° give a good result. Tests have shown that an angle of 120° gives exceptionally good results. The choice of this angle can in principle also be somewhat larger, for instance even 140° or 150°.

Reference is made to FIG. 2 for the operation of the device and the effects of the method.

Prior to performing the method, material for treating, for instance meat pieces 20 such as fillets, are carried into container 1 via filling opening 12.

Starting from a neutral position of the container, these fillet pieces will come to lie on the bottom. Motor 18 is then switched on, whereby the container will begin to execute its tilting movement on the shaft. When the position shown in FIG. 2 is reached, the meat pieces will drop off bottom plate 7 onto side plate 4. This side plate 4 therefore performs the function of collision surface.

When the container moves back the meat pieces will slide along the collision surface 4 onto bottom plate 6 and, upon arrival at the other extreme position, which forms the mirror image of the position shown in FIG. 2, the meat pieces 20 will drop off the bottom onto side plate 5 which here fulfils the function of collision surface. It is essential here that the bottom surface 7 is placed vertically.

The thus described process can be repeated a great number of times. It is important herein that the meat pieces are regularly struck by a collision surface, thereby increasing their tenderness.

According to another method, the striking of the meat pieces is used to cause the meat to absorb a liquid. Water, brine and so on can be envisaged here. This also has the function of improving the quality of the meat. For this purpose the relevant liquid is introduced into container 1 prior to or subsequent to infeed of the meat pieces, whereafter the same tilting operations are performed. The meat is herein treated such that it slowly absorbs the available liquid.

Of significance here is the fact that the quantity of brine or other liquid absorbed by the meat can be determined precisely, which is important in assessing the effectiveness of the device. Furthermore, the absorption of the brine by the meat can hereby be precisely determined.

The above embodiment is described with reference to the treatment of meat. It will be apparent that other products and materials can also be treated, such as laundry for cleaning.

A significant advantage compared to the prior art devices is the fact that a relatively large number of small quantities of meat can be treated simultaneously.

Figure 3:
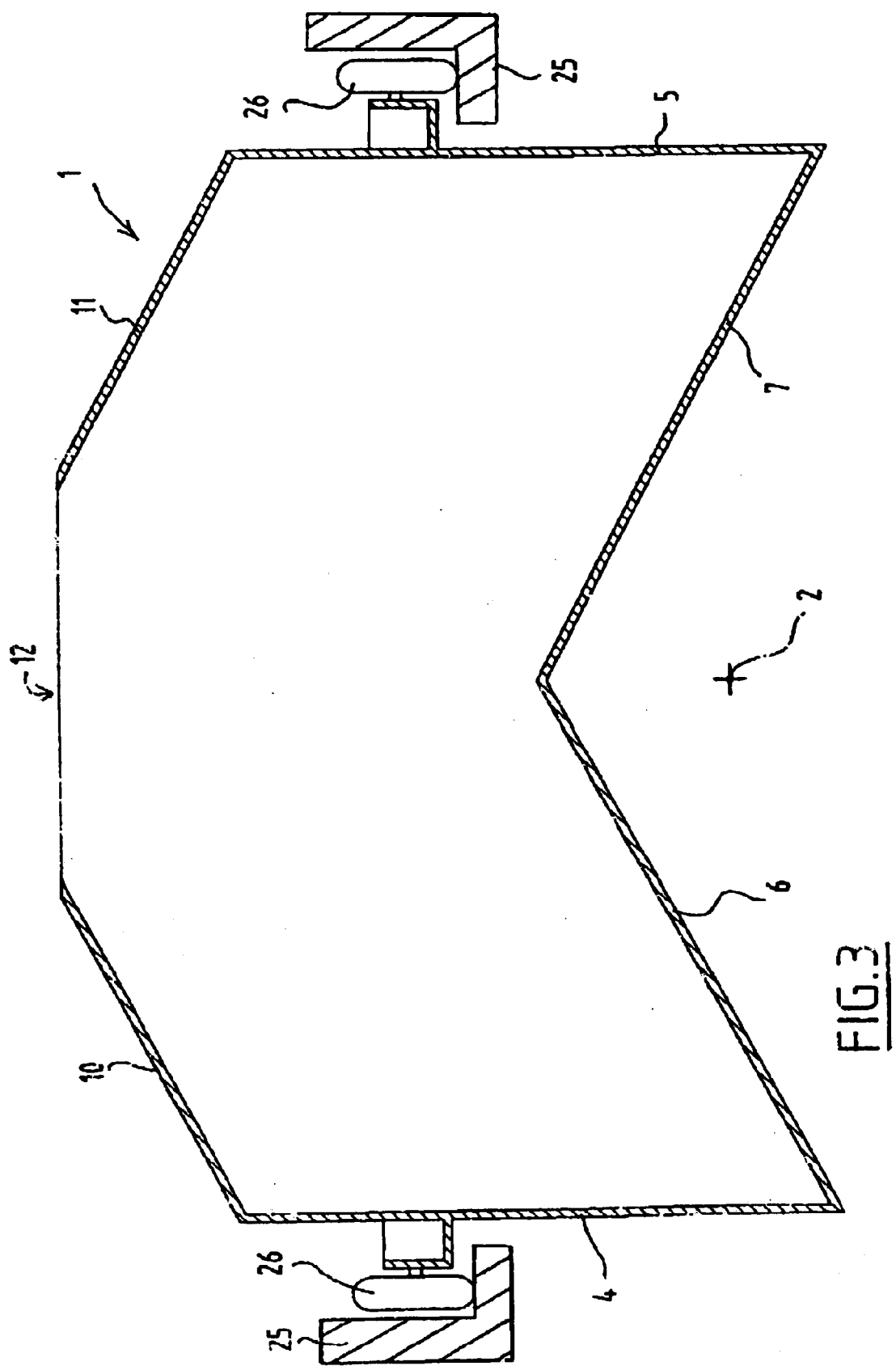
FIG. 3 is a cross-sectional view of the container shown in FIG. 1.
Figure 4:
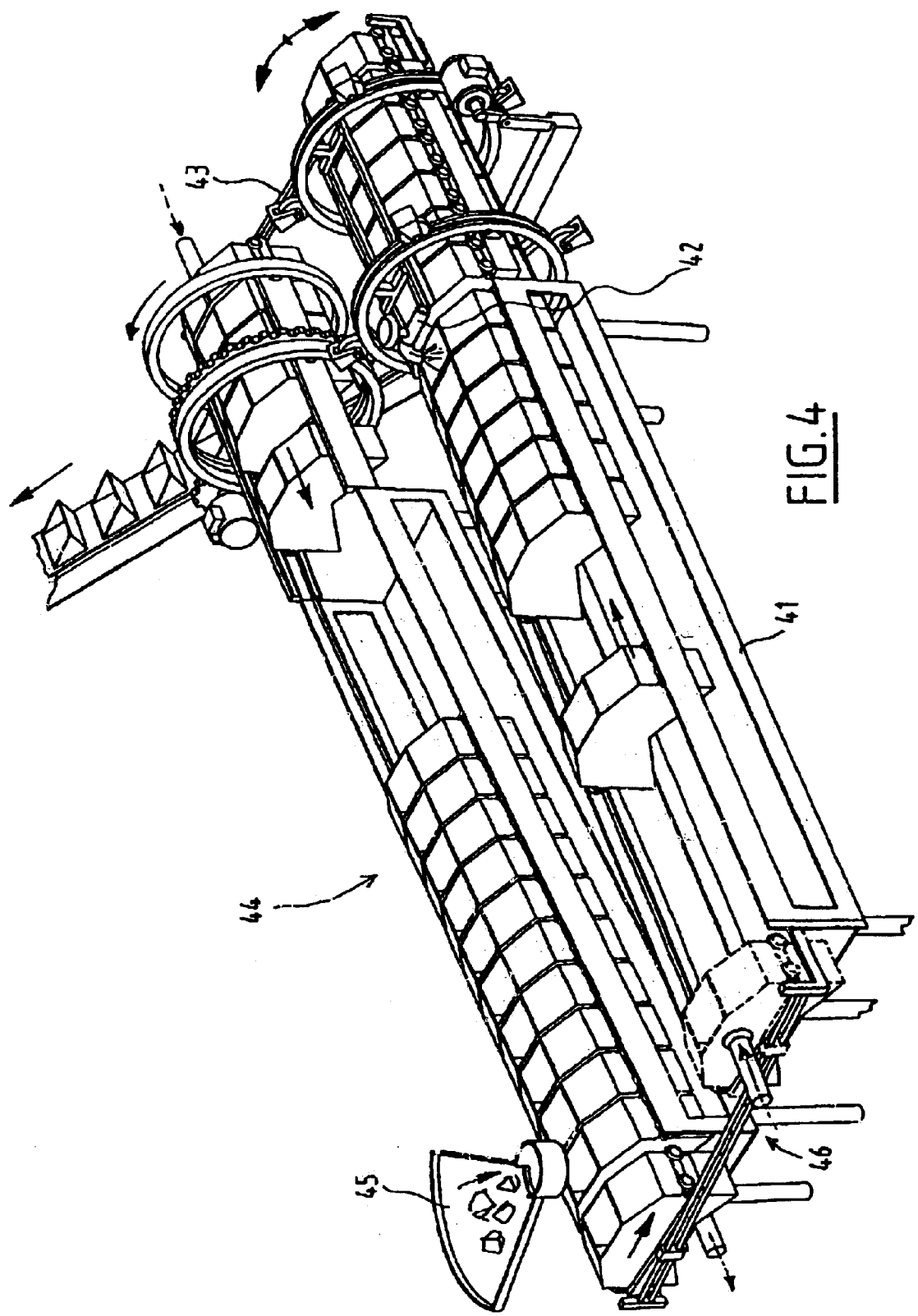
FIG. 4 shows a perspective schematic view of a second embodiment of the present invention.

FIG. 3 shows a further embodiment of a device according to the invention. Separate containers 1 are herein placed in a frame 21 as shown in FIG. 4 which is driven in its entirety for execution of the tilting movement. Frame 21 is formed by two rings 22 respectively 23 which rest on rollers 24. Rings 22,23 are connected by side rails 25, on which can rest wheels 26 connected to the containers.

Containers 1 are placed successively with their wheels 26 on rails 25, whereafter they can be displaced in the axial direction as further new containers are placed.

The geometry of the containers is shown in this drawing; it will be apparent that other geometries can be applied, although at present the illustrated geometry is recommended. It is important that the products for treatment release from the wall 6 or 7 shortly before reaching an extreme position and drop freely to the other wall 6 or 7. Because of the dynamics of the movement the other wall will already be making a movement in the opposite direction, which increases the effect of the impulse of the collision. The speed of the drive is also important in imparting a 'swing' to the falling products; this also increases the effect of the collision.

As shown in FIG. 4, use is made for driving of the tilting movement of a connecting rail 27 between rings 22,23. The rail 27 is connected to a crank 29 mounted on a shaft 28 by means of a U-shaped lever 30. The U-shape of lever 30 results from the wish not to disrupt the transport of containers 1 in the axial direction.

The opening 12 on the top side of the container is closed by a cover 32.

Such a device is for instance suitable for subjecting six containers simultaneously to a recurring movement. A container is herein subjected to the tilting movement for instance for six periods of for instance one minute each. Although this is not shown in the drawing, it is possible to move the ring 25 upward. The containers can hereby be pushed against covers arranged in the frame.

In order to move the rail upward, use is preferably made of a flexible rod which can be filled with a gas and which then moves toward the rails of the cover. Other drives are also possible. This means that a high meat-processing capacity is sustained with batches of manageable size; this means that a single person can load a container, place it on the rack, remove a subsequent container and empty it. The tilting movement will of course have to stopped for placing and removal of containers.

Figure 5:
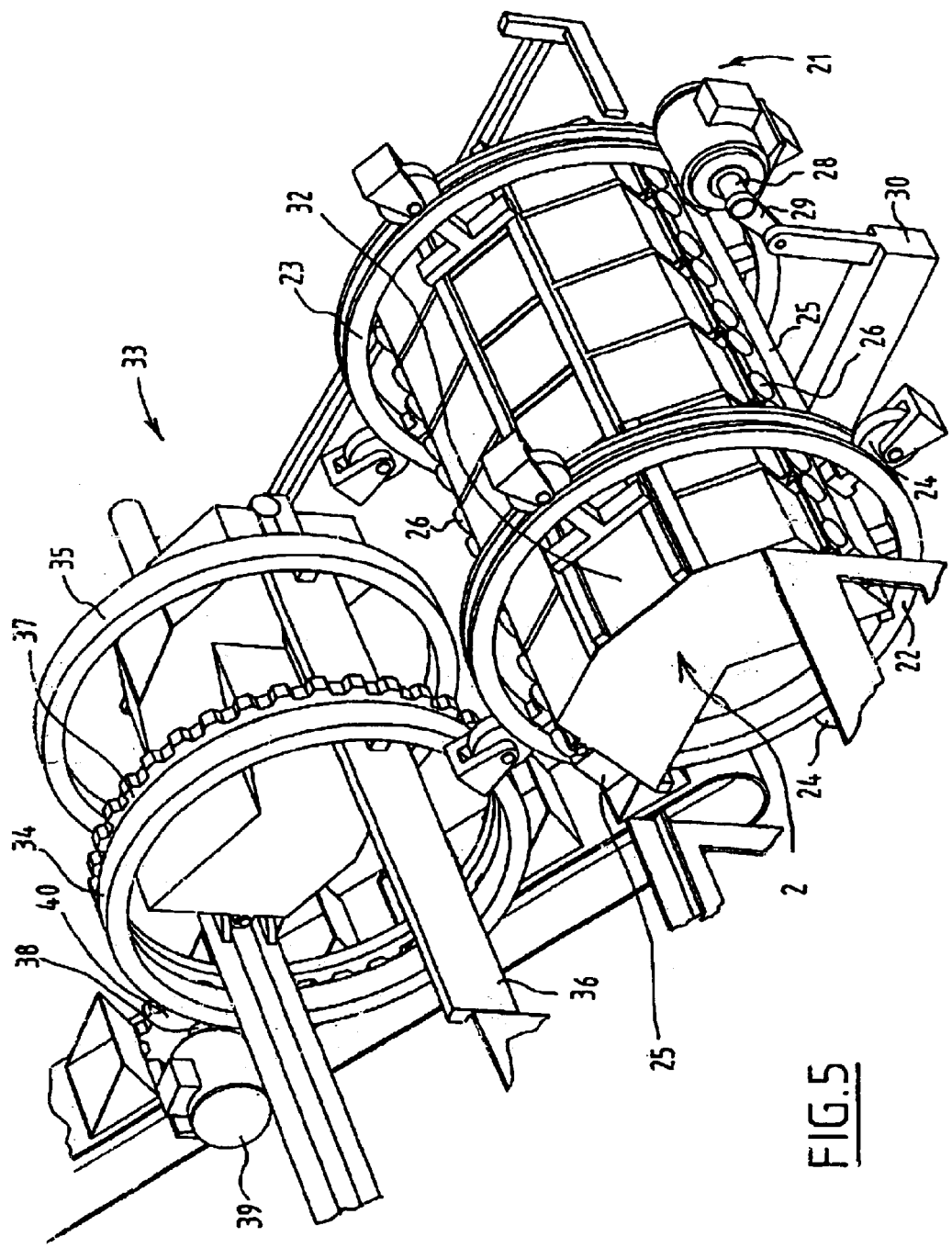
FIG. 5 is a detail view of the device shown in FIG. 4.

FIGS. 4 and 5 also show a construction 33 which bears some resemblance to the frame 21. The object of this construction is to tilt the containers in order to empty them. This construction therefore comprises two rings 34,35 which are connected by rails 36 on which the wheels 26 of containers 1 can travel. The rails are however formed such that the wheels also hold the containers in the tilted situation. For driving of the construction use is made of a gear rim 37 which is arranged on ring 34 and which is in engagement with a pinion 40 arranged on a shaft 38 of motor 39.

FIG. 5 shows the further elements of a device operating in fully automated manner. The device comprises an inclining supply frame 41 with integrated rails which leads to frame 21. Arranged above the position immediately preceding the frame is a crane 42 for optional supply of a liquid to the content of the containers.

The containers coming out of the frame are moved obliquely upward to the unloading device 33 via a crossbeam 43. The containers leaving the unloading device are fed via a discharge frame 44 to a feed hopper 45, where the containers are filled with products for treatment. A cleaning device for the containers can be incorporated into discharge frame 44.

Finally, a second crossbeam 46 of the filling device 45 leads to the inclining supply frame.

It will be apparent that further diverse modifications can be made in this device.

What is claimed is:

1. Method for treating products wherein the products are placed in a container, are subsequently subjected to impacts through movements of the container and are finally taken out of the containers, and wherein the products in the container collide with a substantially flat surface, characterized in that the container executes a reciprocating movement extending over only a part of a revolution of the container.

2. Method as claimed in claim 1, characterized in that the products are formed of food products such as meat or fish pieces, that water is introduced into the container and that during the impacts in the container the food products at least partially absorb the water present in the container.

3. Method as claimed in claim 1, characterized in that products from a single transport container are placed in groups in the container, are treated and are placed from the container into a single transport container.

4. Method as claimed in claim 1, characterized in that the container on an end of a movement frame is placed into the movement frame, that the movement frame is suitable for containing more than one container, that the movement frame is drivable to execute a recurring movement and that simultaneously with placing of a container at one end a container is removed from the movement frame at the other side.

5. Device for treating products, comprising a container which is movable on a substantially horizontal rotation axis, at least two substantially flat collision surfaces which are arranged in the container such that when the recurring movement of the container is executed, the products placed in the container repeatedly strike at least one collision surface, and a drive device to cause the container to execute a recurring movement, characterized in that two collision surfaces are arranged in the container which are placed symmetrically relative to the axis of rotation, that the container is opened on its upper side, and that the drive device is adapted to cause the container to repeatedly execute a part of a revolving reciprocating movement with extreme position at each end of the reciprocating movement.

6. Device as claimed in claim 5, characterized in that a holding surface is arranged connecting onto each of the collision surfaces, wherein the holding surfaces are symmetrical relative to the axis of rotation, the holding surfaces intersect at an angle lying between 90° and 135°, and that the axis of rotation of the movement lies below the intersecting line of the holding surfaces.

7. Device as claimed in claim 5, characterized in that the drive device comprises a crank or eccentric which is drivable by a motor and which is coupled to the container by means of a drive rod.

8. Device as claimed in claim 5, characterized in that the drive device and the container are adapted to hold a liquid in the extreme position of the container.

9. Device as claimed in claim 5, characterized in that the container is adapted to treat effectively a quantity of products corresponding with the useful capacity of a transport container usual for transporting the products to be subjected to treatment.

10. Device as claimed in claim 5, characterized in that the container is placed removably on carriers arranged in a frame, wherein the frame is drivable for the recurring movement.

11. Device as claimed in claim 10, characterized in that the carriers are adapted to carry at least two containers.

12. Device as claimed in claim 11, characterized in that the carriers are connected to at least two elements extending in a circular arc which are driven in accordance with the reciprocating movement.

13. Device as claimed in claim 12, characterized in that supply means are arranged on one side of the frame for supplying containers and discharge means are arranged on the other side of the frame for discharging the containers.

14. Device as claimed in claim 11, characterized in that supply means are arranged on one side of the frame for supplying containers and discharge means are arranged on the other side of the frame for discharging the containers.

15. Device as claimed in claim 14, characterized in that the drive device is adapted to cause the reciprocating movement of the frame to stop during supply and discharge of the containers.

16. Device as claimed in claim 14, characterized in that discharge means for the containers are connected to an unloading device and that a loading device is connected to the supply means.

17. Device as claimed in claim 16, characterized in that the unloading device is connected to the loading device.

18. Device as claimed in claim 11, characterized in that a cover for the containers is arranged in the frame and that the carriers are movable toward the cover.

19. Device as claimed in claim 10, characterized in that a cover for the containers is arranged in the frame and that the carriers are movable toward the cover.

20. Device as claimed in claim 19, characterized in that supply means are arranged on one side of the frame for supplying containers and discharge means are arrange on the other side of the frame for discharging the containers.

* * * * *